Nov. 5, 1963

H. L. JAMESON 3,109,210

MOISTURE CONTROL APPARATUS FOR USE WITH
A TWO-STAGE CONTINUOUS MIXER

Filed April 28, 1960

*INVENTOR.*
HOWARD L. JAMESON
BY Whittemore
Hulbert & Belknap
ATTORNEYS

United States Patent Office 3,109,210
Patented Nov. 5, 1963

3,109,210
MOISTURE CONTROL APPARATUS FOR USE WITH A TWO-STAGE CONTINUOUS MIXER
Howard L. Jameson, Ferndale, Mich., assignor to Harry W. Dietert Co., Detroit, Mich., a corporation of Michigan
Filed Apr. 28, 1960, Ser. No. 25,438
4 Claims. (Cl. 22—89)

The invention relates to moisture control apparatus for use with a two-stage continuous mixer and refers more specifically to apparatus for automatically controlling the moisture content of granular material having a variable temperature which is discharged from a two-stage continuous mixer.

It is an object of the invention to provide apparatus for controlling the addition of moisture to granular material as it passes through a two-stage continuous mixer to provide a granular material output therefrom having a predetermined moisture content.

Another object is to provide apparatus for mixing granular material including a two-stage mixer, means for continuously introducing granular material into the first stage thereof at an upper level, means for transferring the granular material from a lower level of said first stage to a lower level of the second stage, means for discharging said granular material from an upper level of said second stage, and means operably associated with said mixer for controlling the moisture content of the granular material mixed therein.

Another object is to provide apparatus for mixing granular material as set forth above, wherein said means for controlling the moisture content of the granular material comprises moisture supply means for introducing moisture into the first stage of said mixer at said upper level thereof substantially uniformly over the granular material therein, and means operable to regulate the quantity of moisture introduced through the moisture supply means in accordance with the moisture content of the granular material.

Another object is to provide apparatus for mixing granular material as set forth above, wherein said moisture supply means comprises a plurality of spray heads rotatably mounted over said mixer, a conduit for supplying moisture to said spray heads, and a moisture control valve located in said conduit operable to control the moisture supply to said spray heads through said conduit.

Another object is to provide apparatus for mixing granular material as set forth above, wherein said means to regulate the quantity of moisture introduced through the moisture supply means comprises a probe sensitive to the moisture content of granular material in said mixer, an electronic circuit operable to produce a signal on the moisture content of the granular material as sensed by said probe reaching a predetermined value, and a control circuit for operating said moisture control valve in accordance with the signal developed by said electronic circuit.

Another object is to provide apparatus for mixing granular material as set forth above, wherein said electronic circuit includes means for compensating for temperature variations of granular material placed therein.

Another object is to provide apparatus for mixing granular material as set forth above, wherein said control circuit includes timing means operable to prevent operation of said moisture control valve due to transient conditions in the granular material.

Another object is to provide apparatus for mixing granular material as set forth above which is simple in structure, economical to manufacture, and efficient in use.

Other objects and features of the invention will become apparent as the description proceeds, especially when taken in conjunction with the accompanying drawings, illustrating a preferred embodiment of the invention, wherein:

FIGURE 1 is a partially schematic and partially diagrammatic illustration of apparatus for mixing granular material according to the invention.

FIGURE 2 is a top view of the two-stage mixer illustrated in section in FIGURE 1.

FIGURE 3 is an end view of the two-stage mixer illustrated in FIGURE 2 taken in the direction of arrows 3—3 in FIGURE 2.

Figure 4:
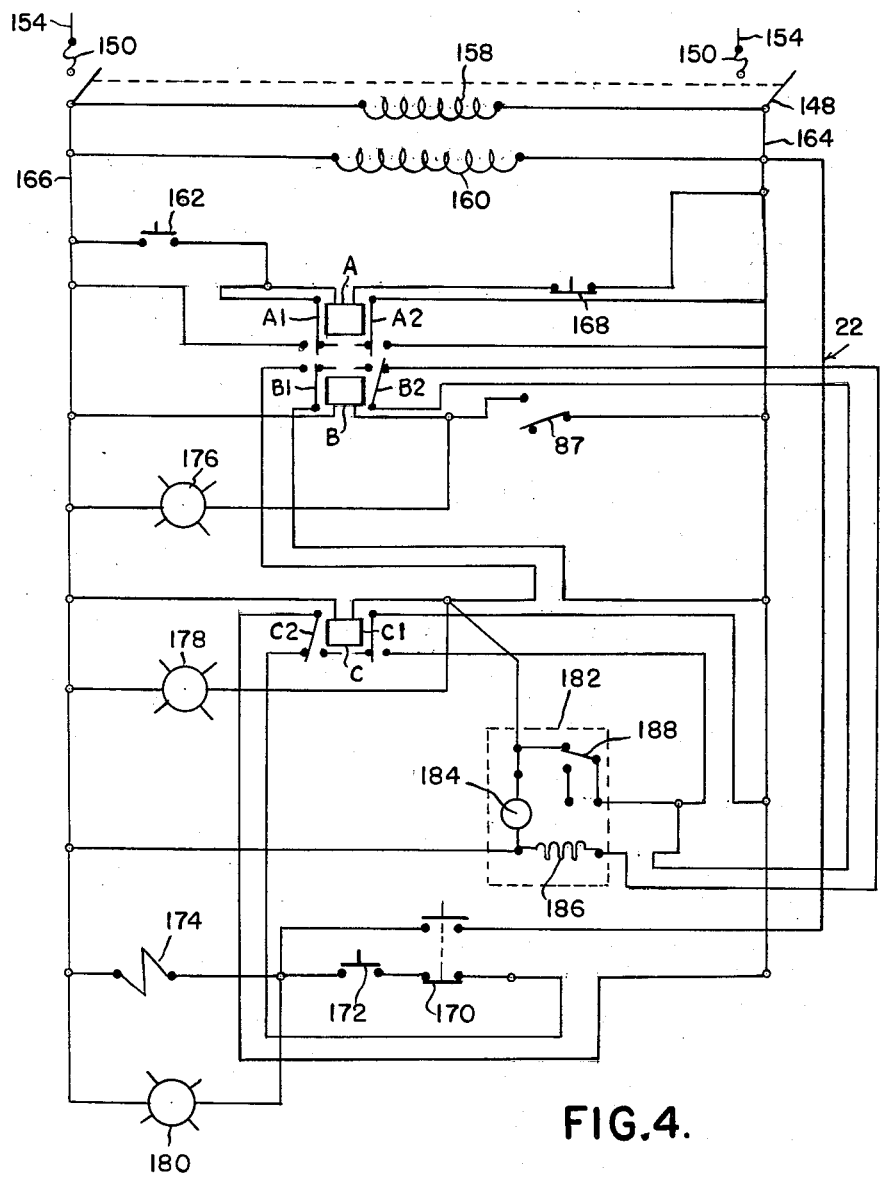
FIGURE 4 is a schematic diagram of the control circuit of the moisture control apparatus illustrated in FIGURE 1.

With reference to the drawings a particular embodiment of the invention will now be disclosed.

In accordance with the invention, moisture control apparatus generally indicated 10 is provided in conjunction with a two-stage continuous mixer 12 to regulate the moisture content of granular material 13 passed through the mixer 12.

The moisture control apparatus 10 comprises a probe 14 mounted in mixer 12, and moisture supply means 16 for adding moisture to the granular material 13 within the mixer 12 including the automatic moisture control valve 18. The moisture control apparatus 10 further includes an electronic circuit 20 for developing a signal in accordance with the moisture content of the granular material within the two-stage mixer as sensed by the probe 14 and a control circuit 22 for operating the valve 18 in accordance with the signal developed in the electronic circuit 20 whereby moisture is supplied to the granular material 13 in accordance with the sensed moisture content thereof.

In operation the granular material 13 is fed through the mixer 12 continuously. The probe 14 senses the moisture content of the granular material. A signal is developed in electronic circuit 20 in accordance with the sensed moisture content of the granular material in the mixer. The developed signal is used to operate the moisture control valve 18 of the moisture supply means 16 to provide granular material having a predetermined moisture content.

More specifically, the two-stage mixer 12 comprises a pair of cylindrical intersecting containers 24 and 26 having open tops and being connected at their intersection as shown best in FIGURE 2. The containers 24 and 26 as shown are in communication with each other for the full depth thereof at their intersection. The degree of communication between the containers 24 and 26 may be controlled by sliding plates 28 and 30 which extend for the full depth of the containers 24 and 26 and are movable transversely with respect to the aligned radii of the containers 24 and 26.

Container 26 includes a discharge opening 32 opposite the intersection of the container 26 with the container 24 which opening is positioned at an upper level in the container, as illustrated best in FIGURE 3. A gate 34 is provided for determining the exact vertical dimension of the opening 32.

The containers 24 and 26 are provided with centrally located rotatable shafts 36 and 38 respectively which have secured thereto for rotation therewith rollers 40 and 41 and plows 42 and 43 and 44 and 45 respectively, as shown best in FIGURES 1 and 2. Rollers 40 and 41 in addition to being rotatable with the shafts 36 and 38 are supported for vertical movement relative to the bottom 46 of the mixer 12 to accommodate different levels of granular material within the mixer 12.

Plows 42, 43, 44 and 45 are arcuate as illustrated best in FIGURE 2, and have their radially inner ends offset with respect to the axis of rotation of the rotating shafts 36 and 38 whereby plows 42 and 44 move granular material radially outwardly within the containers 24 and 26 respectively on rotation of the shafts 36 and 38 in a clockwise direction, while the plows 43 and 45 move the granular material radially inwardly during the same rotation of the shafts 36 and 38. Plows 43 and 45 as shown best in FIGURE 1, besides plowing the bottom of the containers 24 and 26 also scrape the sides thereof due to the L-shaped configuration and position thereof as shown in FIGURE 1.

In operation, granular material is introduced into container 24 from hopper 48 by means of conveyor 50, and shaft 36 is rotated whereby the granular material closest the bottom 46 of the two-stage mixer 12 in the container 24 is caused to rotate and to eventually pass the intersection of containers 24 and 26 at which time a part thereof is delivered into the container 26. The granular material is then mixed in the container 26 and passes upward therein due to the action of the plows 44 and 45, and is eventually caused to pass out of the opening 32 through gate 34 onto conveyor 52.

In the past it has been difficult to control the moisture content of the granular material passing through the two-stage continuous mixer 12 as described above, due to the fact that the mixer is not suitable for use in conjunction with moisture control apparatus constructed to be operable in conjunction with granular material moving on a continuous conveyor, or in conjunction with batch type moisure control apparatus wherein a predetermined amount of moisture and granular material are mixed in a container and subsequently discharged therefrom.

The moisture supply means 16 of the moisture control apparatus 10 of the invention includes a moisture delivery conduit 54 for transferring water from a supply (not shown) to a reservoir 56, spray heads 58 and automatic moisture control valve 18.

Reservoir 56 and spray heads 58 are supported on shaft 36 as shown in FIGURE 1 for rotation therewith. The reservoir 56 is in communication with the crossed spray heads 58 as shown in FIGURES 1 and 2. A manual on-off valve 60 is also provided in conduit 54.

In operation, the spray heads 58 and reservoir 56 are caused to rotate about the axis of the shaft 36 whereby on addition of water to the reservoir 56 moisture is added uniformly over the surface of the granular material within the container 24 through the spray heads 58. The amount of moisture added to the granular material 10 is controlled by means of manually operated valve 60 and the automatically operated moisture control valve 18.

Thus it can be readily appreciated that moisture control apparatus wherein the moisture sensing means is secured to the rotating arms of the plows or rollers, the signal from which is sensed through a commutator secured to the rotating shaft 36, would be undesirable for use with the two-stage continuous mixer 12 since rotation of the spray heads 58 would be restricted and proper mixing of the moisture with the granular material as it is introduced into container 24 would not take place.

Probe 14 of the moisture control apparatus 10 as illustrated in FIGURES 1 and 2 is mounted in the bottom of the container 24 of the continuous mixer 12. Probes such as 14 are well known in the moisture control industry and will not be considered in detail. Probe 14 is constructed so that the impedance thereof varies with the moisture content of the granular material positioned within the continuous mixer 12.

In operation, moist granular material is pressed against the probe 14 each time a roller 40 passes thereover during mixing of the granular material. The impedance of the probe at this time varies with and is representative of the moisture content of the granular material.

The electronic circuit 20 comprises power supply means 62 including transformer 64, rectifier 66, capacitors 68 and 70, resistors 72 and 74 and voltage regulator tubes 76 and 78 connected as shown to provide a regulated voltage for applying to the oscillator rectifier 80 and the amplifiers 82 and 84.

The oscillator rectifier 80 comprises the diode, triode tube 86, capacitors 88, 90, 92, 96 and 98, coils 99 and 100, and resistors 102, 104 and 106 connected as shown in FIGURE 1. As indicated in FIGURE 1, the grid 108 of the triode portion of the tube 86 is connected by means of a conductor 110 to capacitive probe 14.

In operation, the impedance of probe 14 is such that the oscillator portion of the tube 86 is caused to stop oscillating when the moisture content of the granular material within the mixer 12 is of a desired value. When the tube 86 stops oscillating the rectifier portion thereof ceases to conduct whereby the positive bias on amplifier tube 82 is substantially reduced.

Reducing the positive bias of the amplifier tube 82 causes the tube 82 to cease conducting through resistor 111 whereby the voltage at the plate 112 of tube 82 is caused to raise substantially. Raising of the plate voltage of the tube 82 produces a sufficient voltage differential across the neon tube 114 to cause firing thereof.

On firing of the neon tube 114 the bias on amplifier tube 84 which is maintained at a level sufficient to cause conduction of amplifier tube 84 before firing of tube 114 by means of rectifier circuit 116 including capacitors 117 and 119 through resistor 118 is lowered whereby the amplifier tube 84 ceases to conduct through the solenoid 85. Thus on the moisture content of the granular material in mixer 12 reaching a predetermined value the solenoid actuated switches 87 and 89 are caused to close a circuit to relay coil B in control circuit 22 and to remove the ground connection from the resistance 91 of the amplifier 82 as shown.

Temperature compensating means 120 is provided acting in conjunction with probe 14 and the capacitors 88, 90, 92 and 98 of tube 86 of the electronic circuit 20 to vary the capacitance in the oscillator portion of the tube 86 in accordance with the temperature of the granular material placed in the mixer 12, whereby the effect of granular material temperature on the moisture content of the granular material is compensated for.

Temperature compensating means 120 shown in FIGURE 1 comprises a thermocouple 122 inserted within mixer 12 so that the resistance thereof varies with the temperature of the granular material 10 within the mixer 12, slide wire means 124, and means for converting a direct current signal from battery 126 into an alternating current signal and amplifying the alternating signal. The last mentioned means includes converter 128, input amplifier 130, voltage amplifier 132 and power amplifier 134. The temperature compensating means further includes motor 136 receiving the output of power amplifier 134 and driving a temperature indicator 138 over dial 140, said motor also driving temperature compensating capacitor 142 by means of cam 144.

In operation of the temperature compensating means 120, as the resistance of the thermocouple 122 varies with the temperature of the granular material in the continuous mixer 12 an unbalanced condition will exist in the resistances of the slide wire 124 whereby a direct signal from battery 126 will appear at the terminals of converter 128. This direct signal is converted by the converter into an alternating signal. The alternating signal is then amplified by means of amplifiers 130, 132 and 134. The amplified signal is used to operate the motor 136.

The direction of operation of the motor is dependent upon the polarity of the signal applied to the converter. With proper choice of thermocouple 122 and gearing means the motor 136 can be caused to turn in a direction such that the cam 144 rotated thereby will adjust the capacitor 142 to maintain a total capacitance in conjunction with the oscillator portion of the tube 86 such that the tube 86 will stop oscillating when the moisture content of the granular material is such as to produce the desired moisture content of granular material discharged from the two-stage mixer 12 regardless of the temperature at which the granular material is introduced into the mixer.

Capacitor 146 in parallel with the temperature compensating capacitor 142 in conjunction with capacitor 98 associated with the oscillator portion of the tube 86 operate to provide a fine and coarse adjustment respectively of the total capacitance of the oscillator portion of the tube 86. Capacitors 146 and 98 may thus be adjusted to cause the oscillator portion of the tube 86 to stop oscillation when the moisture content of the granular material is at a predetermined value.

The over-all operation of the moisture control apparatus 10 of the invention will now be considered in conjunction with the control circuit 22 illustrated in FIGURE 4.

In operation, granular material to be mixed and to which it is desired to impart a specific moisture content is fed from hopper 48 onto conveyor 50 by which it is continuously fed into the top of container 24 of the continuous two-stage mixer 12. Granular material having a predetermined moisture content is fed out of opening 32 past gate 34 in container 26 of the second stage of the continuous two-stage mixer 12 and onto conveyor 52 by which it is continuously removed from the mixer 12.

Within the containers 24 and 26 of the two-stage mixer 12 the granular material is rotated by means of the plows 42, 43, 44 and 45 and compacted by means of rollers 40 and 41. As previously indicated, the granular material in the container 24 is moved radially inwardly by plow 43 and is moved radially outwardly by plow 42. Thus granular material being rotated by plow 42 is forced through the opening formed between the adjustable plates 28 and 30 and into the container 26 at the bottom thereof on rotation of shaft 36.

The granular material which enters container 26 at the bottom thereof eventually is forced upward in the container 26 and is moved around the container to opening 32 therein by means of the plows 44 and 45 secured to shaft 38 of the two-stage mixer 12.

Thus the sequence of travel of the granular material in the two-stage mixer 12 is from an upper level in container 24 to a lower level thereof, after which it is transferred into container 26 at the lower level from whence it moves upward in the container 26 and eventually out of the mixer 12 through opening 32.

As previously indicated, moisture is added to the granular material through moisture supply means 16 as the granular material is rotated in container 24. The amount of moisture added to the granular material during passage thereof through the continuous two-stage mixer 12 is controlled automatically by the electronic circuit 20 in conjunction with the control circuit 22.

With the introduction of granular material into the container 26 the switch 148 which is connected to a source of power through fuses 150 and conductors 154 is closed to complete a circuit through the primary windings 158 and 160 of transformers operate to supply power to the temperature compensating means 120 and the electronic circuit 20.

The start push-button switch 162 is then closed to complete an electric circuit through relay coil A, conductors 164 and 166, and the stop push-button switch 168. Normally open contacts A1 closed by relay coil A on energization thereof serve to maintain the relay coil A energized after release of push-button switch 162. Contacts A2 are also closed due to energizing of relay coil A whereby the solenoid 174 is energized through normally closed contacts C2, and the normally closed portion of the manual over-ride switch 170 and the closed manual on-off switch 172. Energizing solenoid 174 causes the automatic moisture control valve 18 in the moisture supply means to open, whereby moisture is added to the granular material in the container 26 through spray heads 58 rotating on shaft 36.

When sufficient moisture has been added to the granular material in mixer 12 to bring the moisture content thereof up to a predetermine level as sensed by the probe 14 current through solenoid 85 in the electronic circuit 20 will be lowered to a point where the solenoid actuated switch 87 will be caused to close. Such operation of switch 87 will cause relay coil B to be energized and indicator lamp 176 to be lit. Lamp 176 remains lit as long as switch 87 remains closed, thus indicating those periods during which the moisture content of the granular material in the mixer 12 is at or above a desired level.

Energizing relay coil B causes normally open relay contacts B1 to close and normally closed relay contacts B2 to open. Closing contacts B1 causes the relay coil C to be energized and indicator lamp 178 to light.

Energizing relay coil C causes the normally open relay contacts C1 to close and normally closed relay contacts C2 to open. Opening of normally closed relay contacts C2 will deenergize solenoid 174 whereby the automatic moisture control valve 18 in water supply means 16 is caused to close, thereby preventing the addition of more moisture to the granular material in the mixer 12. Indicator lamp 180 is provided in parallel with solenoid 174 to indicate the periods during which moisture is not added to the granular material.

During the period in which moisture is not being added to the granular material means are provided including timing apparatus 182 for periodically checking the moisture content thereof as additional granular material is added to the mixer 12. Timing apparatus 182 includes motor 184, clutch 186 and switch 188.

Thus on energizing relay coil C to close contacts C1 a holding circuit through contacts C1 and switch 188 is provided to maintain relay coil C energized should contacts B1 open due to the return of switch 87 to the position shown in FIGURE 4 on the moisture content of the granular material dropping below the predetermined amount. When the moisture content of the granular material does drop below the predetermined amount due to addition of granular material to mixer 12, and relay switch 87 returns to the position shown in FIGURE 4, relay coil B will be deenergized and the contacts B2 will be caused to engage to energize clutch 186 and start the timing cycle.

The timing apparatus may be set for any specified period, for example three seconds. After the prescribed period the timing apparatus causes the switch 188 to open thereby breaking the by-pass circuit for relay coil C so that if relay coil B remains deenergized for three seconds causing contacts B1 to be open at the time switch 188 is open, the relay coil C is deenergized.

Deenergizing of the relay coil C will cause closing of the contacts C2 to energize solenoid 174 and open the automatically controlled moisture supply valve 18. Moisture is thus again added to the granular material in the mixer 12 until the moisture content again reaches the predetermined amount at which time the above sequence of events in the automatic control circuit will again occur.

Thus the automatic control circuit 22 provides means whereby the addition of moisture to the granular material in the mixer 12 is stopped at a predetermined value as set by the calibration condensers 98 and 146 and determined by probe 14 and thereafter periodically checks the moisture content of the granular material at predetermined intervals and when it is indicated that the moisture content is below the predetermined value causes the addition of moisture thereto.

The timing means functions to prevent addition of moisture to the granular material due to a single sampling of the moisture content of the granular material which might give an untrue moisture reading due to transient conditions in the granular material since the switch 188 remains in the closed position for a predetermined time, for example three seconds after the probe senses the predetermined moisture content while sample readings of moisture content occur more often, such as for example every second.

The drawings and the foregoing specification constitute a description of the improved moisture control apparatus for use with a two-stage continuous mixer in such full, clear, concise and exact terms as to enable any person skilled in the art to practice the invention, the scope of which is indicated by the appended claims.

What I claim as my invention is:

1. Granular material conditioning apparatus comprising a two-stage mixer including a pair of adjacent cylindrical, intersecting containers having an opening therebetween defined by the intersection thereof, means for continuously introducing granular material into the first container at the top thereof, means within said container for mixing the granular material and for transferring the granular material from the first container to the second container of the mixer including a pair of plows rotatably mounted in each container of the mixer at the bottom thereof, means for discharging said granular material from said second container of said mixer at a point in spaced relation to the bottom of said second container, means operably associated with the first container of said mixer for adding moisture to the granular material in the first container of the mixer at the top thereof, means positioned in the first container of said mixer adjacent the bottom thereof for sensing the moisture content of the granular material in the first container of said mixer, means for controlling the quantity of moisture introduced into the first container of said mixer in accordance with the sensed moisture content of the granular material in the first container of said mixer and means for varying the opening between the containers of the mixer to vary the quantity of granular material transferred between the first container and second container on rotation of the plows.

2. Structure as set forth in claim 1, wherein the means for adding moisture to the granular material in the first container comprises a reservoir positioned over the first container for receiving and storing a quantity of moisture, a plurality of radially extending tubular members of different lengths in communication at their radially inner end with the reservoir, spray heads secured to the radially outer end of the tubular members whereby moisture from the reservoir is sprayed on granular material within the first container at different radial positions as the granular material is mixed in the first container on rotation of the plows.

3. Structure as set forth in claim 1 wherein the means for varying the opening between the containers comprises plates slidably mounted between the containers extending the full depth of the containers and movable transversely with respect to the opening between the containers for opening or closing the opening between the containers.

4. Structure as set forth in claim 1 wherein the plows are arcuate, are substantially radially aligned with each other in each container and are angularly displaced by 180° in the two containers.

References Cited in the file of this patent

UNITED STATES PATENTS

| | | |
|---|---|---|
| 2,314,486 | Dvorak | Mar. 23, 1943 |
| 2,825,946 | Dietert et al. | Mar. 11, 1958 |
| 2,863,191 | Dietert et al. | Dec. 9, 1958 |
| 2,886,868 | Dietert et al. | May 19, 1959 |
| 2,943,801 | McIlvaine et al. | July 5, 1960 |
| 2,954,215 | Warmkessel | Sept. 27, 1960 |
| 3,000,064 | Dietert et al. | Sept. 19, 1962 |
| 3,000,065 | Dietert et al. | Sept. 19, 1962 |